Sept. 18, 1956  E. M. REEDY ET AL  2,763,282
PIPE STOPPER FITTING

Filed Aug. 18, 1952  6 Sheets-Sheet 1

INVENTORS:
Emmett M. Reedy,
Frank H. Mueller,

BY Cushman, Darby & Cushman
ATTORNEYS.

Sept. 18, 1956  E. M. REEDY ET AL  2,763,282
PIPE STOPPER FITTING
Filed Aug. 18, 1952  6 Sheets-Sheet 2
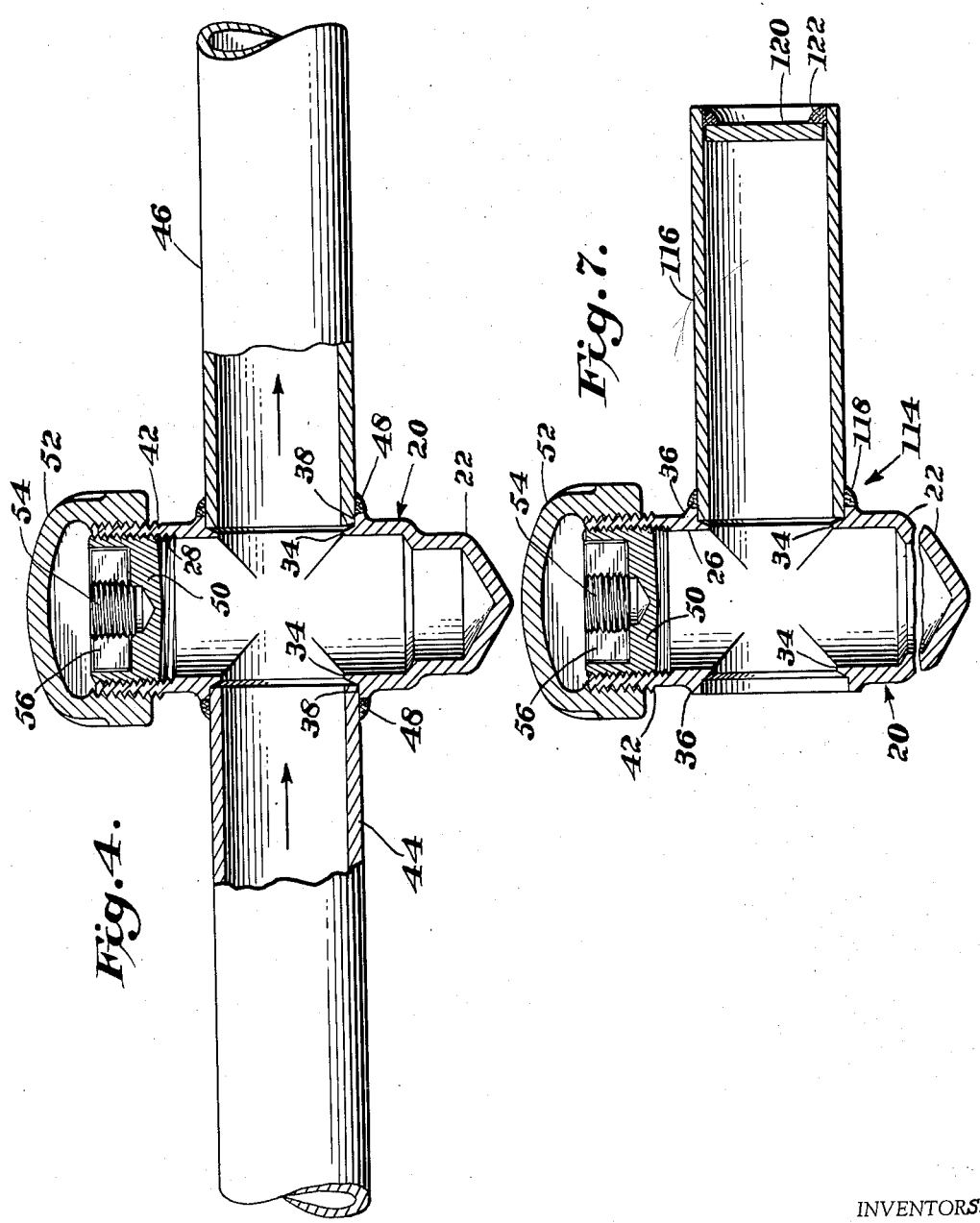
INVENTORS:
Emmett M. Reedy,
Frank H. Mueller,
BY Cushman, Darby & Cushman
ATTORNEYS.

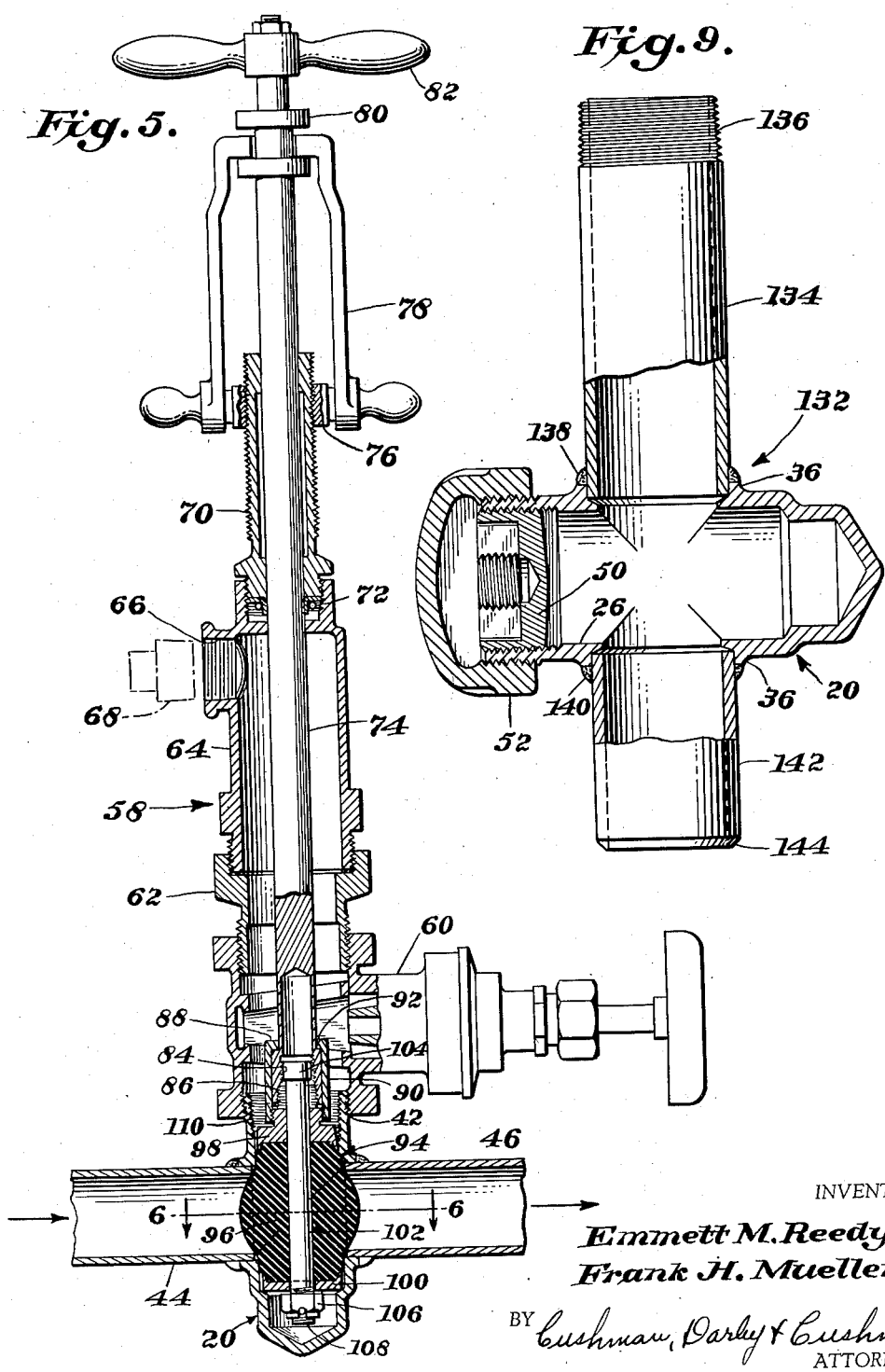

Sept. 18, 1956 E. M. REEDY ET AL 2,763,282
PIPE STOPPER FITTING
Filed Aug. 18, 1952 6 Sheets-Sheet 4
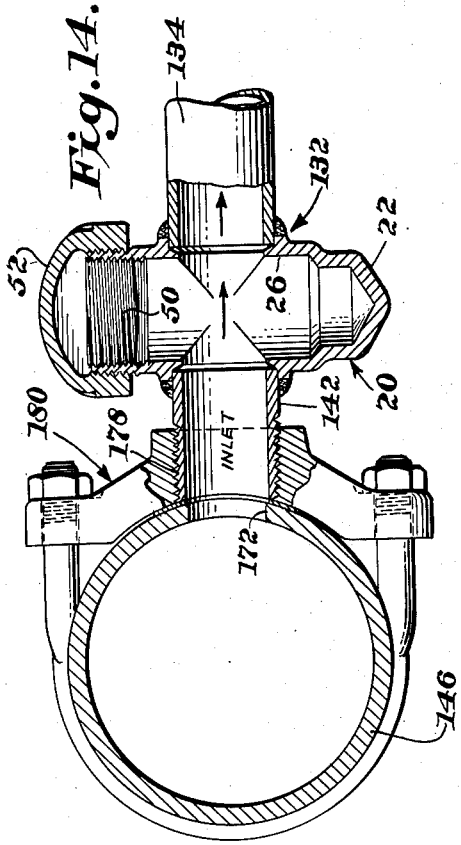
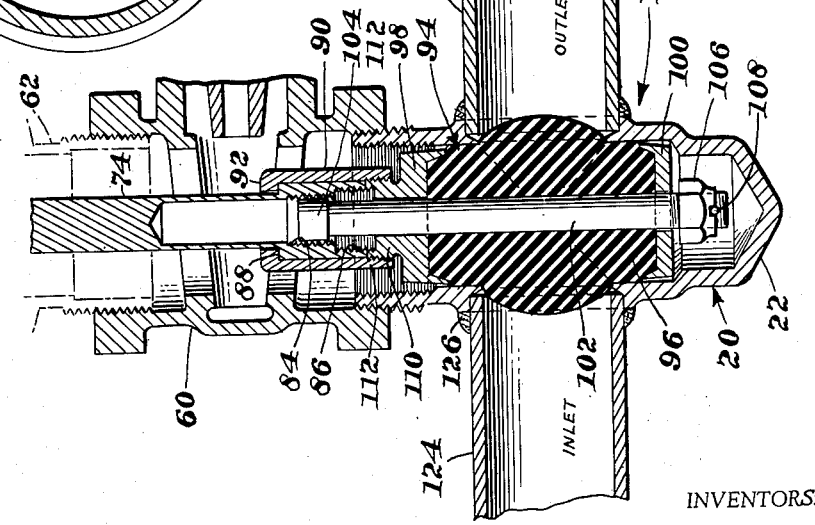
INVENTORS:
*Emmett M. Reedy,*
*Frank H. Mueller,*
BY *Cushman, Darby & Cushman*
ATTORNEYS.

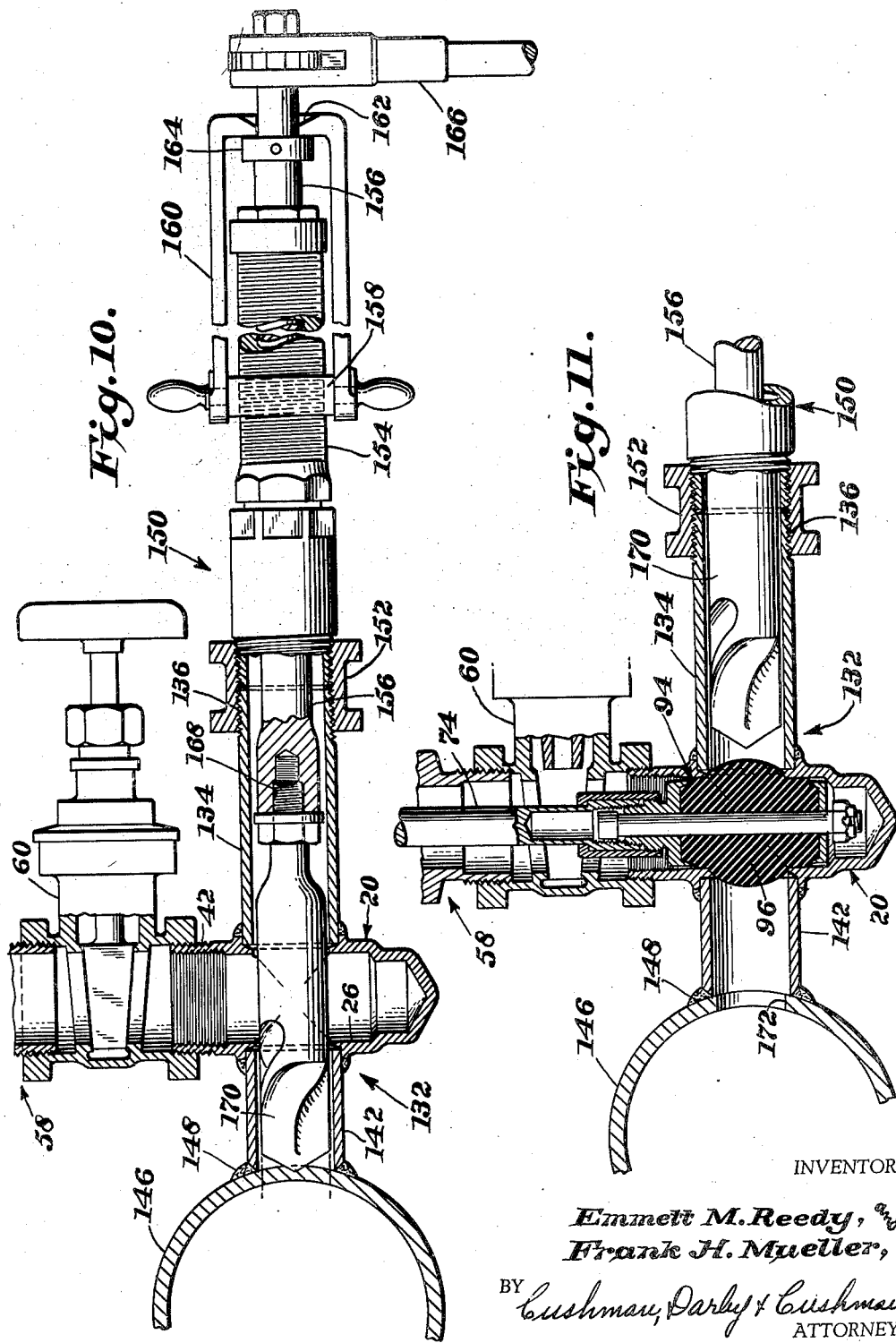

Sept. 18, 1956     E. M. REEDY ET AL     2,763,282
PIPE STOPPER FITTING
Filed Aug. 18, 1952                                6 Sheets-Sheet 6
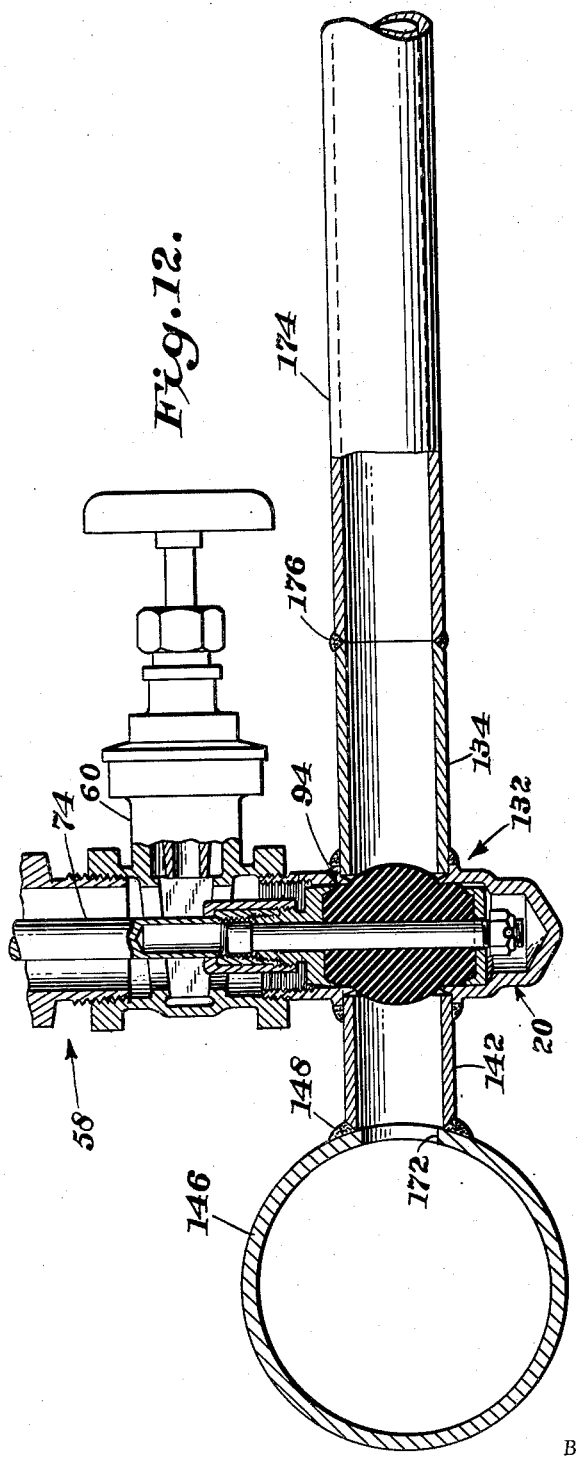
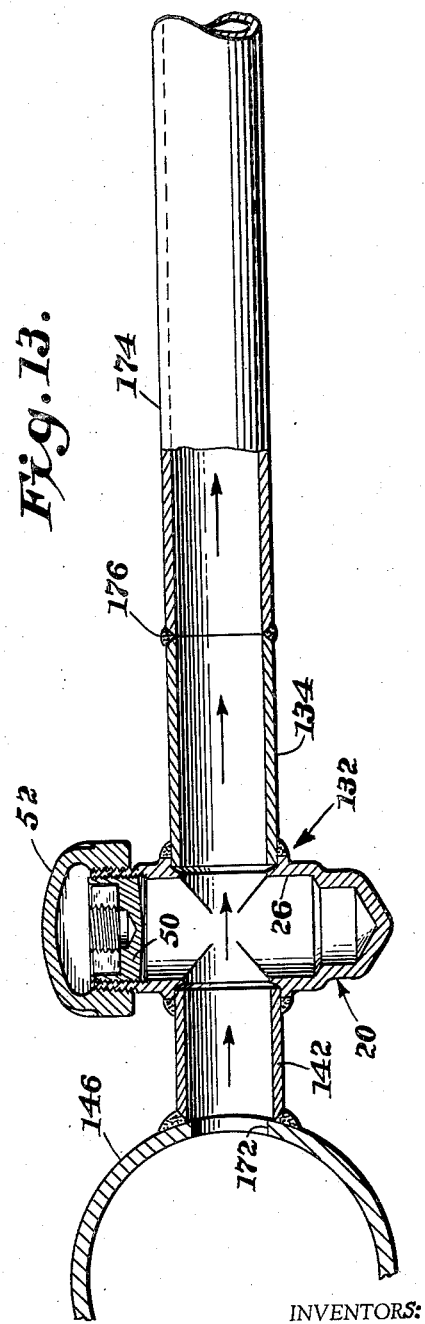
INVENTORS:
*Emmett M. Reedy,*
*Frank H. Mueller,*
BY *Cushman, Darby & Cushman*
ATTORNEYS.

United States Patent Office 2,763,282
Patented Sept. 18, 1956

2,763,282

PIPE STOPPER FITTING

Emmett M. Reedy, Los Angeles, Calif., and Frank H. Mueller, Decatur, Ill., assignors to Mueller Co., Decatur, Ill., a corporation of Illinois Application August 18, 1952, Serial No. 304,866

3 Claims. (Cl. 137—318)

This invention relates to pressure control fittings for pipe line use, and more particularly to stopper fittings which may be connected into a new pipe line for use with a stopping machine having an expansible stopper to shut off flow of fluid through the line.

Fittings of this general nature are known in the art for application to existing pipe lines which are already in place. These fittings of necessity, however, are of two-part construction for enclosing a line, and are adapted to be either welded or sealingly clamped thereto. Before an expansible stopper can be used to shut off flow through the line, a diametric cut-out must be made through the line, which extends through the fittings, by an enclosed drilling machine. The edges of such cut-out subsequently are engaged by an expansible stopper to shut off flow through the line. This two-part type of stopper fitting has several disadvantages which may be eliminated by stopper fittings embodying this invention.

Among the above mentioned disadvantages are the fact that existing fittings of the type under consideration require a drilling operation to form the cut-out in the pipe line prior to stopping operations, and also require a rather extensive welding operation for application of the fittings to a line. Further, the flow stopping engagement of the expansible stopper is made with the edges of the cut-out portion of the pipe line. Obviously, these edges are rough and burred and in many instances greatly damage the expansible stopper, which usually has a solid one-piece rubber body or is provided with a rubber covering to provide the necessary seal.

Accordingly, it is an object of this invention to provide an improved stopper fitting of the type under consideration which is particularly adapted to be installed in new pipe line construction with a minimum amount of welding.

It is another object of this invention to provide a stopper fitting of the type under consideration which is inexpensive to manufacture and to install, and which, in conjunction with a stopping machine, serves the purpose of a valve, but at less expense than the latter article.

It is still another object of this invention to provide a stopper fitting, for use with new pipe line construction, which possesses a smooth-walled bore for engagement with the rubber sealing surfaces of a stopper to thereby avoid damage to such surfaces.

It is still another object of this invention to provide a stopper fitting of the type described which may be installed in new pipe line construction at any point along the length of the latter to provide, in conjunction with a stopping machine, convenient, inexpensive, and readily available means for shutting off flow through the line without loss of pressure.

It is still another object of this invention to provide a stopper fitting of the type under consideration which may be conveniently installed at the end of new pipe line construction and to which an extension of the pipe line readily may be connected, in axial alignment with the line, at any future time, such fitting serving, in conjunction with a stopping machine, to prevent loss of pressure from the pipe line during connection of an extension to the same.

It is a further object of this invention to provide a stopper fitting of the type under consideration which may be secured radially to a main and used, in conjunction with a stopping machine and an enclosed drilling machine, for tapping the main and connecting a lateral extension thereto without interruption of service through the main; such stopper fitting also being adapted to have the lateral extension connected in axial alignment thereto.

Other objects and advantages of this invention will be apparent from the following description and accompanying drawings in which:

Figure 4 is a view corresponding to Figure 1 and showing the fitting connected into a pipe line and plugged and capped.

Figure 5 is a view corresponding to Figure 4 and showing the stopping machine connected to the fitting and in operative position to shut off fluid flow through the line.

Figure 7 is a longitudinal sectional view through a modified form of stopper fitting embodying this invention and showing a plug and a cap connected to such fitting.

Figure 8 is a longitudinal sectional view of the fitting shown in Figure 7 and illustrating the manner of effecting an extension of a pipe line by use of the fitting. A stopping machine is shown connected to the fitting and in operative position to shut off flow therethrough.

Figure 9 is a longitudinal sectional view through another modified form of fitting embodying this invention and showing the fitting plugged and capped.

Figure 10 is a longitudinal sectional view of the fitting shown in Figure 9 and illustrating the method of connecting a lateral line to a main by use of such fitting. An enclosed drilling machine and a stopping machine are shown operatively connected to the fitting.

Figure 11 is a view corresponding to Figure 10 and illustrating the manner of shutting off flow from the main through use of the stopping machine after an opening has been drilled in the main by the drilling machine.

Figure 12 is a view corresponding to Figure 11 and illustrating the connection of a lateral line to the fitting.

Figure 13 is a view corresponding to Figure 12 and illustrating the completion of the lateral connecting operation.

Figure 14 is a view corresponding to Figure 13 and illustrating a modified form of the fitting shown in Figure 9 for use with a tapped main clamp.

Figure 2:
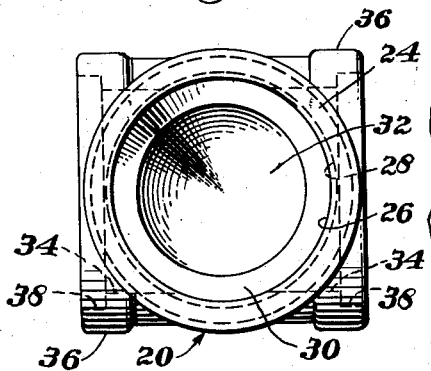
Figure 2 is a plan view of the fitting shown in Figure 1.
Figure 1:
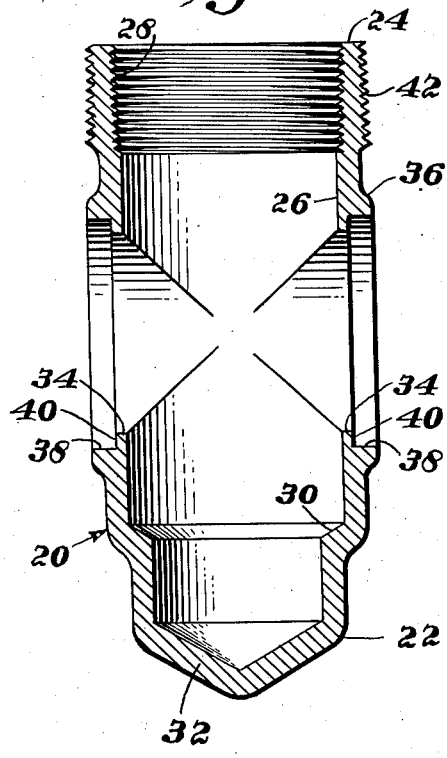
Figure 1 is a longitudinal sectional view through a stopper fitting embodying this invention.
Figure 3:
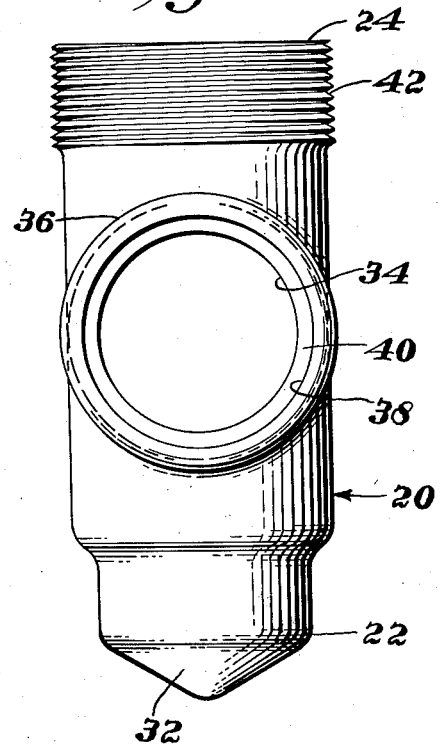
Figure 3 is a side elevational view of the fitting shown in Figure 1.

Referring now to Figures 1 to 3 of the drawings, there is shown an improved stopper fitting 20 embodying this invention. The fitting consists of a one-piece tubular body which has a closed end 22 and an open end 24, and is provided, between these ends, with an interior smooth-walled cylindrical bore 26. The open end 24 of the fitting is provided with interior threads 28 of a minor diameter the same as or slightly greater than that of the bore 26 and which terminate, at their inner ends, adjacent one end of the bore. The other end 22 of the fitting is exteriorly and interiorly reduced, to provide an interior circumferential ledge 30 at the other end of the bore 26, and is closed by an integral end portion 32.

The fitting bore 26 is intersected, intermediate its ends, by a diametric pair of circular openings 34 which extend through the side walls of the fitting 20 and smoothly merge with the surface of the bore. It will be noted that the diameter of these openings 34 is substantially less than the length of the bore 26 so that the latter extends in both axial directions for a considerable distance beyond the edges of the openings. Surrounding the openings 34 are exterior hubs 36, each of which is counterbored, as at 38, to provide an inner annular ledge 40 that forms a seat for a pipe end, as best shown in Figure 4. The open end 24 of the fitting is provided with exterior threads 42 for purposes later described.

The fitting is adapted to be connected into and installed in a pipe line during the laying of the latter. As best shown in Figure 4, such installation is accomplished by seating the opposed ends of pipe sections 44 and 46 comprising the line within the counterbores 38 of the fitting 20 and welding the pipes to the fitting as indicated at 48. The installation is completed by threading a closure plug into the open end 24 of the fitting and covering the thus-plugged end of the fitting with an interiorly threaded cap 52 which engages the exterior threads 42 at the open end of the fitting. It will be noted that the closure plug 50 is of a particular construction having an interiorly threaded socket 54 in its outer face, which socket is intersected by a diametric slot 56 in the outer plug face.

When the fitting is thus installed, it may be used at any future time, with a conventional stopping machine 58 as best shown in Figure 5, for shutting off flow of fluid from the pipe section 44 to the pipe section 46 without escape of pressure from the line. In order to effect a shut off through the line, the cap 52 is first removed, and a gate valve 60 connected to the exterior threads 42 on the fitting 20 with the stopping machine 58 connected to the other end of the gate valve. The stopping machine 58 includes an adapter sleeve 62 having a stopper bell or barrel 64 connected to one end of such sleeve. Adjacent the closed end of the bell or barrel 64 is a lateral outlet 66, closable by a plug 68, and to which an equalizing or purging connection may be made, as is well known in the art. Secured to the top of the barrel 64 is an exteriorly threaded feed sleeve 70 having a stuffing box 72 formed between the sleeve and the closed upper end of the barrel to seal around an inserting bar 74 which is both rotatable and movable axially within the sleeve and the barrel. A handled feed nut 76 mounted on the sleeve 70 has a yoke 78 pivotally connected thereto and provided with a slotted portion engageable with a circumferentially grooved collar 80 fixed on the bar 74 adjacent the upper end thereof. The extreme outer end of the bar 74 is provided with a conventional operating handle 82.

The lower or inner end of the bar 74 is provided with an inner socket 84 having left-hand interior threads, and a lower or outer counterbore socket 86 having right-hand interior threads. The lower end of the bar 74 is slightly enlarged to provide a shoulder 88 for the retention of a sleeve 90 having a radially inwardly extending circumferential flange 92 at the upper end thereof for engagement with the shoulder 88. When the flange 92 is so engaged with the shoulder 88, the other end of the sleeve 90 extends below the lower end of the inserting bar 74 and is interiorly threaded for attachment of an expansible stopper 94 to the bar. The stopper 94 (best shown in Figure 8) includes a solid rubber cylindrical body 96 having end caps 98 and 100. The body 96 is of slightly smaller diameter than the bore 26 of the fitting 20 but considerably longer than the diameter of the fitting openings 34. The caps 98 and 100 and body 96 of the stopper 94 are axially bored for the reception of a rod 102 on which they are slidably mounted and retained thereon by an enlarged head 104 on the upper end and a nut 106 threaded on the lower end and secured by a cotter pin 108. The upper cap 98 has an exteriorly threaded reduced portion 110 engageable by the sleeve 90, and a pair of upstanding lugs 112 engageable in corresponding diametric slots in the lower end of the inserting bar 74, whereby the stopper 94 is fixedly attached to the latter.

Figure 6:
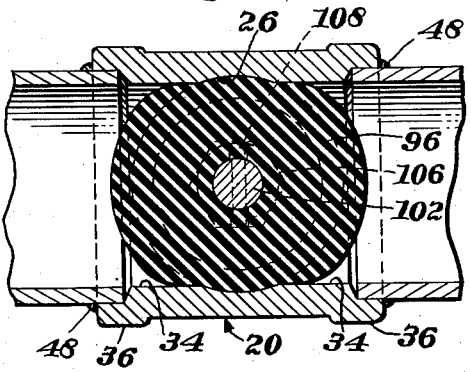
Figure 6 is a sectional view taken on line 6—6 of Figure 5.

In use of the apparatus, the gate valve 60 is opened, as illustrated in Figure 5, and by means of a conventional plug extracting tool (not illustrated), as shown, for example, in the patent to Larry et al., No. 2,171,937, September 5, 1939, and which has been previously attached to the lower end of the inserting bar 74, the plug 50 is removed from the fitting 20 and withdrawn into the barrel 64 of the stopping machine 58. Thereupon, the gate valve 60 is closed, the barrel 64 removed, and the plug extracting tool detached from the end of the inserting bar 74 and replaced by the stopper 94. The barrel is then re-connected to the gate valve, the latter opened, and the stopper 94 pushed into the bore 26 of the fitting 20. In this position of the stopper 94 the lower cap 100 seats against the interior ledge 30 in the fitting so that compression of the body 96, by further downward movement of the upper cap 98, expands the rubber stopper body radially outwardly into sealing engagement with the smooth surfaces of the bore 26 in the fitting, as shown in Figures 5 and 6. This sealing engagement completely surrounds the diametric openings 34 through the side walls of the fitting and, hence, shuts off flow of fluid from pipe section 44 to pipe section 46.

After the purpose for which the shut off was made has been accomplished, i. e., repairs or extensions made to the line, the stopper 94 is pulled up into the barrel 64 by the inserting bar 74, the gate valve 60 closed, the barrel removed from the valve, and the stopper detached from the inserting bar. A conventional plug inserting tool (not illustrated), as shown, for example, in the aforementioned patent to Larry et al., is then attached to the inserting bar 74 and the plug 50 connected to such tool. Thereafter, the barrel, together with the tool and plug, is re-connected to the valve 60, the latter opened, and the bar 74 lowered to thread the plug 50 into the interior threads 28 at the open end of the fitting 20. The stopping machine 58, together with the valve 60 and the inserting tool, may then be completely detached from the fitting 20 and the plug 50 thereafter tightened by means of an appropriate tool (not shown) engaged in the diametric slot 56 in the plug. By threading on the cap 52, the fitting is then returned to its original condition, but may be used again at any future time to accomplish a shut off from pipe section 44 to pipe section 46 by the aforementioned procedure.

A modified form of stopper fitting embodying this invention for use particularly at the end of new pipe line construction in order to facilitate the extension of such line at any future time is shown in Figure 7. This modified fitting 114 consists of the fitting 20 having a short section of pipe 116 seated within one of the body hubs 36 and is welded thereto as indicated at 118. The outer end of the pipe 116 is closed by a closure disk 120 which is welded to the pipe as indicated at 122. In use of this fitting 114, as shown in Figure 8, the other hub 36 of the body 20 is seated over the end of a new pipe line 124 and is welded thereto as indicated at 126. After the plug 50 and cap 52 have been installed on the fitting 114, service pressure may be let into the line 124.

If at any future time, however, it is desired to extend the pipe line 124, the fitting 114 may be utilized, in conjunction with a stopping machine 58, to shut off flow from the line 124 to the pipe section 116 by the aforementioned procedure, and as illustrated in Figure 8. While the stopper 94 is in place within the fitting 114, the outer end of the pipe section 116 may be cut off to remove the closure disk 120, and the severed section end chamfered for facilitating the welding of a line extension 128 thereto, such welding being indicated at 130 in Figure 8.

After the extension 128 has thus been welded to the pipe section 116, the stopper 94 may be withdrawn from the fitting 114 and the same re-plugged and capped without loss of pressure in accordance with the aforedescribed procedure.

By means of another modification a fitting 132 is provided that is particularly adapted for use in connecting a lateral extension to a main. This fitting modification 132 is illustrated in Figure 9 and comprises a fitting body 20 having a relatively short section of pipe 134 provided with a threaded outer end 136 seated within one of the hubs 36 and welded to the fitting body 20 as at 138. Within the other hub 36 is seated and welded to the body 20, as at 140, an even shorter section of pipe 142 having a chamfered outer end 144.

In use of this modification, the pipe section 142 of the fitting 132 is abutted laterally against a main 146, as illustrated in Figure 10, and welded thereto as at 148. A stopping machine 58, as hereinbefore described, is connected, together with a gate valve 60, to the exterior threads 42 on the body 20, and a conventional enclosed drilling machine 150 is connected, by means of an adapter sleeve 152, to the exterior threads 136 on the outer end of the pipe section 134. The drilling machine 150 which may be, for example, similar to that disclosed in the aforementioned patent to Larry et al., includes an exteriorly threaded tubular body 154 and a boring bar 156 sealingly extending through the outer end thereof. Threadedly engaged over the body 154 is a handled feed nut 158 having a yoke 160, similar to the yoke 78 of the stopping machine 58, pivotally connected thereto with its slotted portion 162 engageable over a collar 164 fixed on the boring bar 156 adjacent the outer end thereof. A ratchet type operating handle 166 on the outer end of the boring bar 156 provides a convenient means for manual rotation of the bar. The lower end of the boring bar 156 is provided with an interiorly threaded socket 168 for the detachable connection of a drill 170 thereto.

With the gate valve 60 closed, the drilling machine 150 is operated to extend the drill 170 through the pipe sections 134 and 142 and diametrically through the bore 26 of the fitting 132 to drill a lateral opening 172 (Figure 11) in the main 146. The drill 170 is then retracted into the body 154 of the drilling machine 150, or at least outwardly beyond the bore 26 of the fitting 132, the valve 60 opened, and the stopping machine 58 operated to move the stopper 94 into the fitting bore 26 and to compress the stopper body 96 to shut off flow from the pipe section 142 to the pipe section 134, as shown in Figure 11. The drilling machine 150 may then be detached and removed from the fitting 132 and the threaded section 136 cut off of the outer end of the pipe section 134. The thus-severed outer end of the pipe section 134 preferably is subsequently chamfered to enable a new lateral line 174 to be welded directly thereto, as at 176 and as illustrated in Figure 12. After such line 176 has been thus connected to the fitting 132 and tested for leaks, the stopper 94 may be withdrawn from the fitting 132 and the same re-plugged and capped (Figure 13) in accordance with the aforedescribed procedure.

A new lateral line may thus be connected to a main without loss of pressure, and at the same time may have a fitting incorporated therein adjacent the main, which fitting may be used at any time in the future for shutting off fluid flow from the main into the lateral line in the event that repairs are necessary to the latter.

Although the above described fitting 132 has been shown to have a chamfered end 144 on the pipe section 142 for welding the fitting radially to a main, in some instances it may be desirable to provide other means for securing the fitting 132 radially to a main. For example, as shown in Figure 14 the outer end of the pipe section 142 may be exteriorly threaded, as at 178, for engagement within a tapped main clamp 180 as is well known in the art.

It will thus be seen that the advantages of this invention have been fully and effectively accomplished. It will be realized, however, that the specific embodiments illustrated and described for the purpose of disclosing the principles of this invention may be varied without departing from such principles. For example, although exterior threads 42 have been disclosed at the open end of the fittings 20, 114, and 132 for the connection of a stopping machine or a cap to the fitting, in the case of large fittings and/or fittings intended for extremely high pressure usage, it may be desirable to provide the open end of the fitting with an exterior circumferential flange (not shown) for the purpose of effecting a bolted flange type of connection with a correspondingly flanged type of closure cap or stopping machine. Therefore, this invention includes all modifications which are encompassed within the spirit and scope of the following claims.

We claim:

1. In a pipe stopper for use with a stopping machine and including a stopper fitting and a resilient, compression-expansible cylindrical stopper plug, the improvement of the fitting comprising: a one-piece tubular body of substantially uniform wall thickness having a smooth interior cylindrical bore for removable insertion of the plug therein and of only slightly greater diameter than the plug, when the latter is relaxed, one end of said body being open and the other end closed, said body having in the side wall thereof a pair of diametrically-disposed, axially-aligned, circular openings intersecting said bore between the ends thereof with said bore extending beyond said openings on both sides thereof, said body including diametrically disposed hubs about said openings with each of said hubs being provided with an exterior counterbore to provide a seat for a pipe end and the distance between the outer ends of said hubs being substantially equal to the major exterior diameter of said body, said bore diameter being greater than the diameter of said openings with the inner end of said bore terminating in a ledge facing said body open end and against which the stopper plug may be compressed, said body being abruptly exteriorly and interiorly reduced in diameter beyond said ledge toward said body closed end, said body at the open end thereof having interior threads for engagement with a closure plug, the minor diameter of said threads being at least as large as the diameter of said bore, and said body having at the open end thereof exterior means for connection of a stopping machine thereto.

2. The structure defined in claim 1 including a short section of pipe seated in one of the seats, secured therein, and having a closed outer end.

3. The structure defined in claim 1 including a short section of pipe seated in each of the seats and secured therein, one of said sections having exterior means on the outer end thereof for connection of an enclosed drilling machine thereto, and the outer end of the other of said sections being adapted to be secured radially to a main.

References Cited in the file of this patent

UNITED STATES PATENTS

| | | |
|---|---|---|
| 1,160,703 | Fleming | Nov. 16, 1915 |
| 1,833,700 | Wolf | Nov. 24, 1931 |
| 1,933,117 | Markle | Oct. 31, 1933 |
| 2,165,228 | Cornell | July 11, 1939 |
| 2,171,575 | Larry et al. | Sept. 5, 1939 |
| 2,237,476 | Cline | Apr. 8, 1941 |
| 2,482,687 | Mueller et al. | Sept. 20, 1949 |
| 2,545,504 | Villafane | Mar. 20, 1951 |
| 2,650,620 | Mueller et al. | Sept. 1, 1953 |

OTHER REFERENCES

Crane Co. Catalog No. 49, page 273, published by Crane Co., 836 Mich. Ave., Chicago 5, Ill. Copyright 1949.